Feb. 4, 1941.	M. H. SAVAGE ET AL	2,230,729

TREATMENT OF RUBBER

Original Filed Sept. 16, 1936

Inventors:
Manuel H. Savage,
Francis C. Spargo,
Emil W. Schwartz,
by Harry E. Dunham
Their Attorney.

Patented Feb. 4, 1941

2,230,729

UNITED STATES PATENT OFFICE 2,230,729

TREATMENT OF RUBBER

Manuel H. Savage and Francis C. Spargo, New Haven, and Emil W. Schwartz, Bridgeport, Conn., assignors to General Electric Company, a corporation of New York Original application September 16, 1936, Serial No. 101,074. Divided and this application October 21, 1937, Serial No. 170,242

4 Claims. (Cl. 260—761)

The present invention relates to the treatment of rubber. More particularly the invention is concerned with, and has as an object to provide certain improvements and modifications in processes for preparing crude rubber for rubber compounding.

This application is a division of our co-pending application Serial No. 101,074, filed September 16, 1936, now Patent No. 2,146,594, issued Feb. 7, 1939, and assigned to the same assignee as the present invention.

Figure 1:
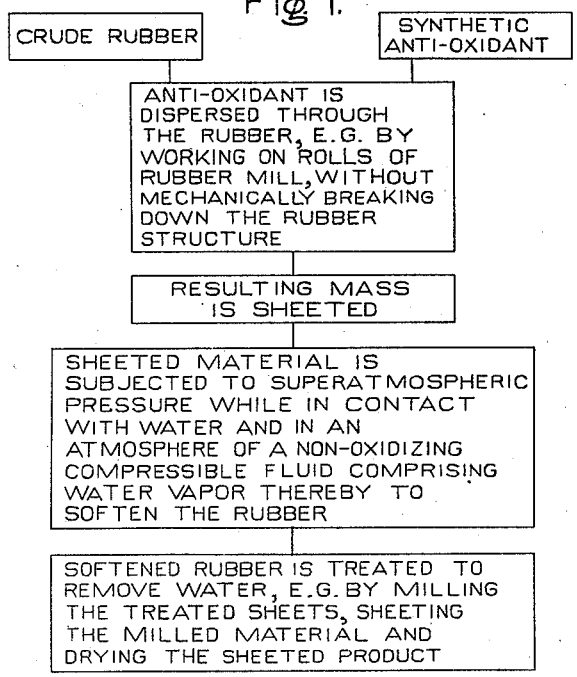
Figure 2:
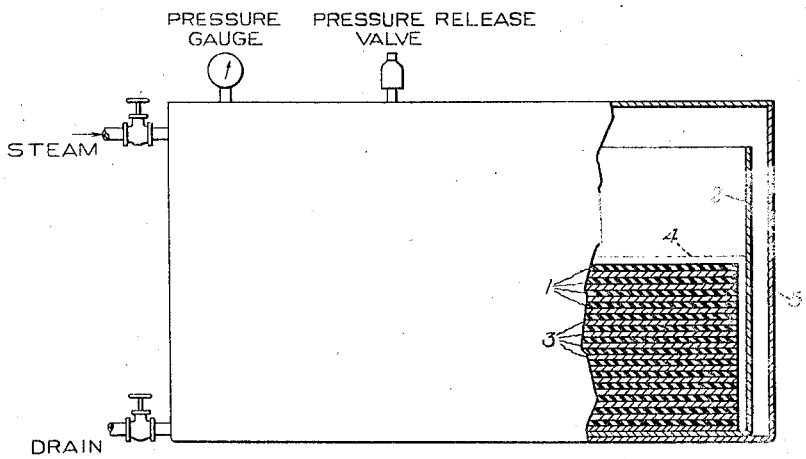

The novel features of the present invention are set forth in the appended claims. The invention itself, however, will be understood most readily from the following description when considered in connection with the accompanying drawing wherein Fig. 1 shows, in the form of a flow chart, operating steps which may be used in carrying the invention into effect; and Fig. 2 represents a plan view, partly in section, of a form of apparatus which may be used in carrying out an essential step of the rubber treatment.

In practicing the present invention crude rubber of commerce is plasticized under superatmospheric pressure, in contact with water and in an atmosphere of a non-oxidizing compressible fluid comprising water vapor, in accordance with a procedure such, for example, as the following:

Crude rubber such as No. 1 smoked sheet rubber, together with about 1 to 3 per cent by weight of the whole, of an anti-oxidant or a mixture of anti-oxidants, is passed through the rolls of a rubber mill until the anti-oxidant is uniformly dispersed through the rubber. An anti-oxidant is a substance that inhibits or retards oxidation catalytically or by preferential absorption of oxygen. Anti-oxidants used in rubber compounding are usually of organic origin. Raw rubbers contain naturally occurring anti-oxidants but the amount present is too small to introduce super-aging properties into a rubber compound. Use of a synthetic anti-oxidant in practicing this invention aids in obtaining a rubber insulating compound of maximum super-aging and heat-resisting properties. Examples of such anti-oxidants that may be used in preparing our improved rubber insulating composition are those known to the trade as "Neozone D," "Neozone E," "Antox" and "B. L. E." "Neozone D" is phenyl-beta-naphthylamine; "Neozone E" consists of about 75 per cent phenyl-beta-naphthylamine and about 25 per cent meta-toluylenediamine oxalate; "Antox" and "B. L. E." are aldehyde-amine reaction products.

After the synthetic anti-oxidant has been uniformly dispersed through the rubber, the mass is sheeted to any desired thickness and size. During these operations care is taken to prevent the rubber from becoming mechanically broken down, that is, from becoming plasticized by mechanical means. The reason for this precaution and, in fact, a main reason why it is desirable to have a non-mechanically plasticized rubber such as is provided by this treatment, is this: When rubber or a rubber compound is mechanically worked for a prolonged period the internal structure of the rubber is detrimentally affected. In other words, what appropriately may be described as the "nerve" of the rubber, and upon which the "life" of rubber or of a rubber compound is more or less dependent, is injured beyond repair by any known subsequent treatment.

The rubber sheets containing added synthetic anti-oxidant and of any convenient size and shape, for example, sheets 3 feet long by 2½ feet wide by ⅛ inch thick, are then placed in a suitable receptacle such as an iron tub for subsequent treatment.

In a particular instance (see Fig. 2 of the accompanying drawing) two hundred pounds of rubber sheets 1 were placed in a tub 2, with metal spacers 3 of the same size as the rubber sheets between each sheet to prevent adhesion of the sheets during subsequent treatment. Sufficient water was added to cover the rubber completely as indicated at 4.

The tub was then placed in an autoclave 5. Super-heated steam was turned into the autoclave and the temperature raised to about 150° C. within about 20 minutes and held at about that same temperature for about 1 hour and 30 minutes. The tub was removed from the autoclave and allowed to cool until it could be handled. The rubber was then passed through a mill to press out some of the water which it had absorbed while in the autoclave. The pressed rubber was sheeted and dried. Drying may be done in a chamber maintained at a temperature below about 100° C., for example, at a temperature of about 80° to 85° C. or by suitable vacuum-drying methods.

Obviously, temperatures and periods of time other than those mentioned hereinabove by way of specific example may be employed in treating the rubber to thermally plasticize it. The particular conditions of treatment are dependent upon various influencing factors such, for example, as the particular characteristics of the original crude rubber and the degree of plasticity it is desired to impart to it. Any temperature sufficiently high and period of time sufficiently long which will result in a plasticized rubber of the improved characteristics herein mentioned may be used. If desired, in addition to steam, other non-oxidizing gases such, for instance, as hydrogen, nitrogen and carbon dioxide, may be introduced into the autoclave to form the gaseous atmosphere. It is essential, however, that water vapor be present as all or a substantial part of the compressible fluid.

A treatment such as the foregoing beneficially affects the useful properties of crude rubber. The workability of the rubber is improved without the aid of rubber softeners, such as stearic acid, paraffin and the like, and without prolonged grinding on rubber mills and the resultant harmful effects upon the rubber. The treatment improves properties of the rubber such, for instance, as elasticity, so that when it is mixed with other ingredients of rubber compounds the whole may be processed without detrimentally affecting, during the usual mechanical treatment, the internal structure of the rubber.

Thermally plasticized rubber may be used in making rubber compounds such, for instance, as those described and claimed in our aforementioned co-pending application Serial No. 101,074, now Patent No. 2,146,594, issued Feb. 7, 1939. When such rubber is employed in rubber compounding, all or a substantial part of the plasticizing agents commonly employed, for example, stearic acid, zinc laurate, vegetable oils, mineral oils and waxes, etc., may be omitted.

Use in rubber compounding of rubber treated as aforedescribed, and which we define as "thermally plasticized" rubber, provides more rapid mixing of the ingredients, less power consumption for mixing, better dispersion in the mixer, smoother running during tubing, less heat generated on warming mills, and less danger of scorching. When such rubber is substituted for ordinary crude rubber in rubber compounding, the resultant rubber composition frequently shows even greater resistance to heat and aging than a product made with crude rubber not so treated.

What we claim as new and desire to secure by Letters Patent of the United States, is:

1. A process of plasticizing rubber which consists in dispersing synthetic anti-oxidant through crude rubber without breaking down the structure of the said rubber, heating the resulting product in a closed vessel under super-atmospheric pressure at about 150° C. for about 1½ hours, and maintaining a non-oxidizing atmosphere consisting of steam and a different gas which is non-oxidizing within the said vessel during the said heating step.

2. In a process of plasticizing crude rubber which comprises subjecting the rubber in a closed vessel to super-atmospheric pressure while in contact with water and in an atmosphere of a non-oxidizing compressible fluid comprising water vapor at a temperature and for a period of time sufficient to increase substantially the plasticity of the rubber but insufficient to cause material deproteinization thereof, the step which consists in dispersing solely a synthetic anti-oxidant with the crude rubber prior to subjecting the rubber to the said plasticizing treatment, said anti-oxidant being dispersed through the rubber without breaking down the rubber structure.

3. A process of preparing crude rubber for rubber compounding which consists in dispersing synthetic anti-oxidant into crude rubber without breaking down the structure of the said rubber, forming the resulting product into sheets, digesting the resultant sheets, submerged in water and separated by spacers to prevent adhesion between the individual sheets, in a closed vessel at super-atmospheric pressure and in an atmosphere of steam at a temperature of about 150° C. for a period sufficient to increase substantially the plasticity of the starting rubber but insufficient to cause material deproteinization thereof, and removing absorbed water from the thus treated rubber.

4. A process of plasticizing rubber which comprises dispersing synthetic anti-oxidant into the rubber without breaking down the rubber structure and subjecting the resulting product in a closed vessel to superatmospheric pressure while maintaining therein a non-oxidizing compressible fluid comprising water vapor, the temperature being sufficiently high and the time of treatment sufficiently long to increase substantially the plasticity of the rubber but insufficient to cause material deproteinization thereof.

MANUEL H. SAVAGE.
FRANCIS C. SPARGO.
EMIL W. SCHWARTZ.